US006134877A

United States Patent [19]

Alkabie

[11] Patent Number: 6,134,877

[45] Date of Patent: Oct. 24, 2000

[54] COMBUSTOR FOR GAS-OR LIQUID-FUELLED TURBINE

[75] Inventor: Hisham S Alkabie, Sudbrooke, United Kingdom

[73] Assignee: European Gas Turbines Limited, United Kingdom

[21] Appl. No.: 09/129,544

[22] Filed: Aug. 5, 1998

[30] Foreign Application Priority Data

Aug. 5, 1997 [GB] United Kingdom ................... 9716439

[51] Int. Cl.[7] ........................................................ F02C 7/20

[52] U.S. Cl. ............................... 60/39.32; 60/748; 60/760

[58] Field of Search ........................... 60/748, 760, 39.32

[56] References Cited

U.S. PATENT DOCUMENTS

| | | | |
|---|---|---|---|
| 3,831,854 | 8/1974 | Sato et al. | 60/748 |
| 3,866,413 | 2/1975 | Strugess | 60/748 |
| 4,226,088 | 10/1980 | Tsukahara et al. . | |
| 4,513,569 | 4/1985 | Sasaki et al. | 60/39.32 |
| 4,872,312 | 10/1989 | Iizuka et al. | 60/760 |
| 4,898,001 | 2/1990 | Kuroda et al. . | |
| 4,928,481 | 5/1990 | Joshi et al. | 60/748 |
| 5,103,632 | 4/1992 | Heitz et al. | 60/760 |
| 5,265,412 | 11/1993 | Bagepalli et al. | 60/39.32 |
| 5,426,943 | 6/1995 | Althaus et al. | 60/760 |

FOREIGN PATENT DOCUMENTS

| | | |
|---|---|---|
| 0 203 431 A1 | 12/1986 | European Pat. Off. . |
| 0 239 020 A2 | 9/1987 | European Pat. Off. . |

*Primary Examiner*—Charles G. Freay
*Attorney, Agent, or Firm*—Kirschstein et al.

[57] ABSTRACT

A combustor for a gas-or liquid-fuelled turbine having a compressor to supply air to the combustor for combustion and cooling, comprises a radially inner member which defines a combustion chamber and a radially outer member, a passage for said air being defined between the inner member and the outer member so as to extend alongside the combustion chamber over at least part of the length thereof and a fuel/air mixer 14 being provided at the upstream end of the combustion chamber, the cross-sectional area of the passage between the two members increasing over at least part of the length of the passage in a direction from the downstream end to the upstream end of the combustion chamber, the passage having an inlet adjacent to the downstream end of the combustion chamber whereby air from the compressor enter the passage at the inlet, and flows in a direction toward the mixer.

17 Claims, 2 Drawing Sheets

COMBUSTOR FOR GAS-OR LIQUID-FUELLED TURBINE

BACKGROUND OF THE INVENTION

This invention relates to a combustor for a gas-or liquid-fuelled turbine.

A turbine engine typically comprises an air compressor, at least one combustor and a turbine. The compressor supplies air under pressure to the combustor or combustors, such air being utilized for both combustion and cooling purposes. Various ways of allocating the air for the two purposes have been proposed. In the normal arrangement a proportion of the air is mixed with the fuel while the remaining air supplied by the compressor is utilized to cool the hot surfaces of the combustor and/or the combustion gases, (i.e. the gases produced by the combustion process).

Environmental considerations and legislation relating thereto continue to drive down the acceptable levels of harmful combustion emissions (specifically $NO_x$ and CO) during operation of such engines. At the same time engineers strive to improve the efficiency of the engines, usually through higher operating temperatures which unhelpfully tend to increase the harmful emissions specifically of $NO_x$; they also look for simpler designs in order to reduce the costs of manufacture and maintenance. Inevitably, there is a conflict in establishing these objectives and compromises have to be made.

The present invention seeks to provide a combustor of relatively simple construction wherein efficient operation (including efficient cooling) is achieved with the production of harmful emissions kept as low as possible.

SUMMARY OF THE INVENTION

According to one aspect of the invention there is provided a combustor for a gas-or liquid-fuelled turbine having a compressor to supply air to the combustor for combustion and cooling, the combustor comprising a radially inner member which defines a combustion chamber, and a radially outer member, a passage for the air being defined between the inner member and the outer member which passage extends generally axially alongside the combustion chamber over at least part of the length thereof and a fuel/air mixer being provided at or adjacent to the upstream end, referred to a direction of working fluid, of the combustion chamber, the passage having a plurality of inlets adjacent to the downstream end of the combustion chamber whereby in use substantially all the air from the compressor enters the passage via the inlets, and flows in a direction towards the mixer to cool the combustor and then enters the mixer to mix with fuel to provide a combustible mixture, the cross-sectional area of the passage between the two members increasing over at least part of the length of the passage in a direction from the downstream end to the upstream end of the combustion chamber.

Preferably the inlets are provided in a transition portion of the outer member and, in use, the air passing through the inlets impinges on a transition portion of the inner member to give impingement cooling.

The radially inner member may be of generally cylindrical formation with a portion of reduced diameter at its upstream end which is affixed to the mixer, and preferably the portion of reduced diameter is shaped to provide an annular chamber in which is provided a seal for sealing engagement with the mixer. A resilient element may be provided to bias the said seal generally radially inwardly into engagement with the mixer and said seal may comprise an annular piston ring arranged so as to be capable of axial sliding movement.

Preferably at least over a part of the length of the passage, turbulence induces are provided to produce turbulence in the flow of cooling air therethrough and said turbulence inducing means may comprise at least one turbulator affixed to a said member to extend into the passage.

The wall of the radially outer member may have a flexible portion and the flexible portion is preferably corrugated to allow for thermal movement of the wall without stress; further the corrugated portion causes turbulence in the airflow through said passage.

Preferably the mixer is affixed in position by fixing element which are removable to allow axial movement of the mixer in a direction away from the combustion chamber.

According to a further aspect of the invention there is provided a combustor for a gas-or-liquid-fuelled turbine, the combustor comprising a member which defines a combustion chamber, a fuel/air mixer which is provided at the upstream end of the combustion chamber, there being a sealing arrangement provided between the member and the mixer, said sealing arrangement comprising a substantially annular seal received in a recess provided in the member and/or the mixer, said annular seal being acted upon by a resilient element to move it generally radially relative to the member.

Preferably the recess is defined by a pair of spaced generally radially extending wall portions of the member and a generally axially extending portion of the member extending between said radially extending portions. The resilient element may be in the form of at least one spring and the spring may take the form of an annular spring with a wave-like configuration.

It is also envisaged that the annular seal may take the form of a flexible piston ring arranged so as to be capable of axial sliding movement.

BRIEF DESCRIPTION OF THE DRAWINGS

An embodiment of the invention will be described by way of example with reference to the accompanying drawings in which.

DETAILED DESCRIPTION OF THE EMBODIMENTS OF THE INVENTION

Figures 1, 2:
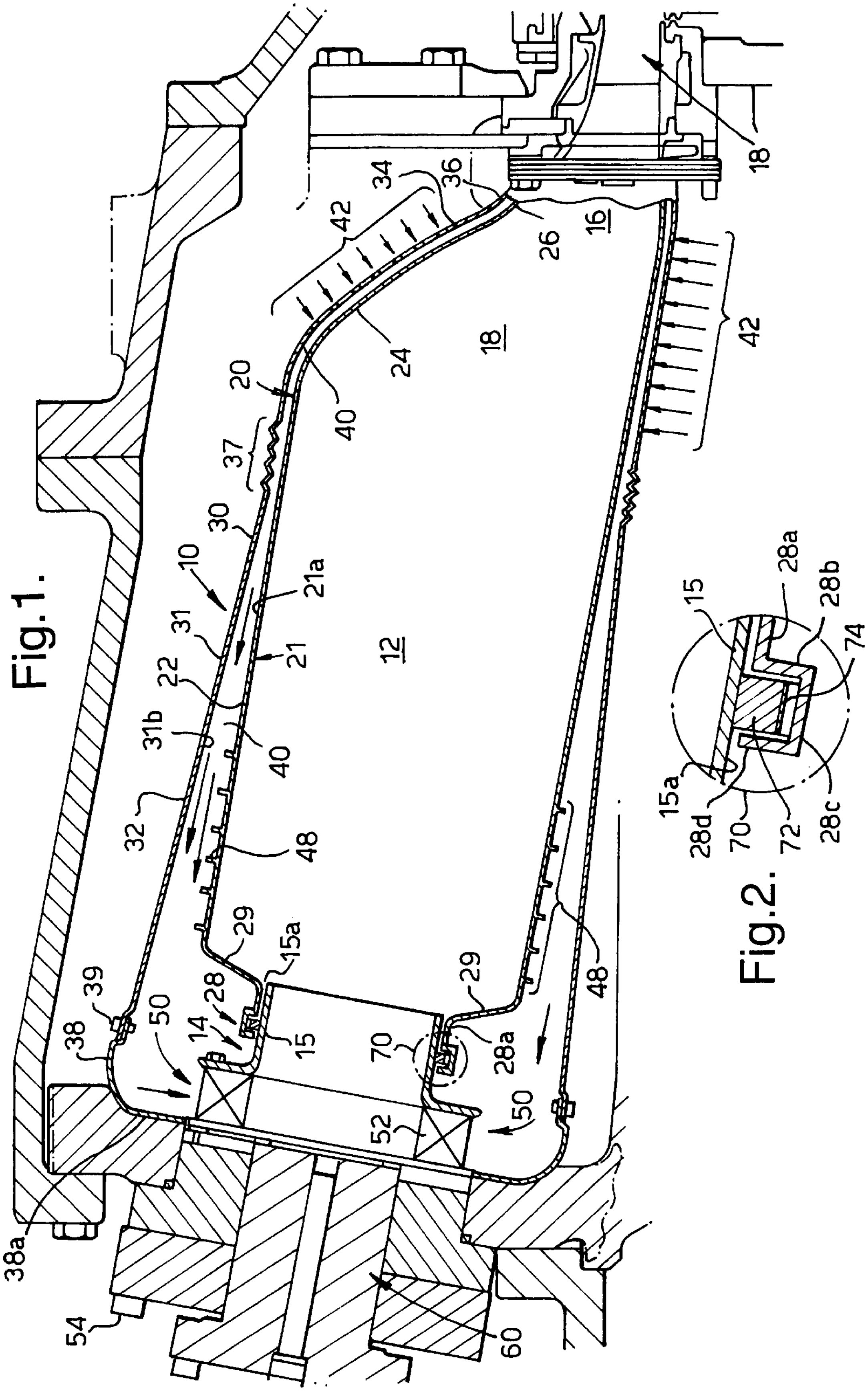
FIG. 1 shows a diagrammatic axial section through an embodiment of a can-type combustor according to the invention.
FIG. 2 illustrates a piston sealing arrangement for sealing the wall of the combustion chamber to an air/fuel mixer arrangement.
Figure 3:
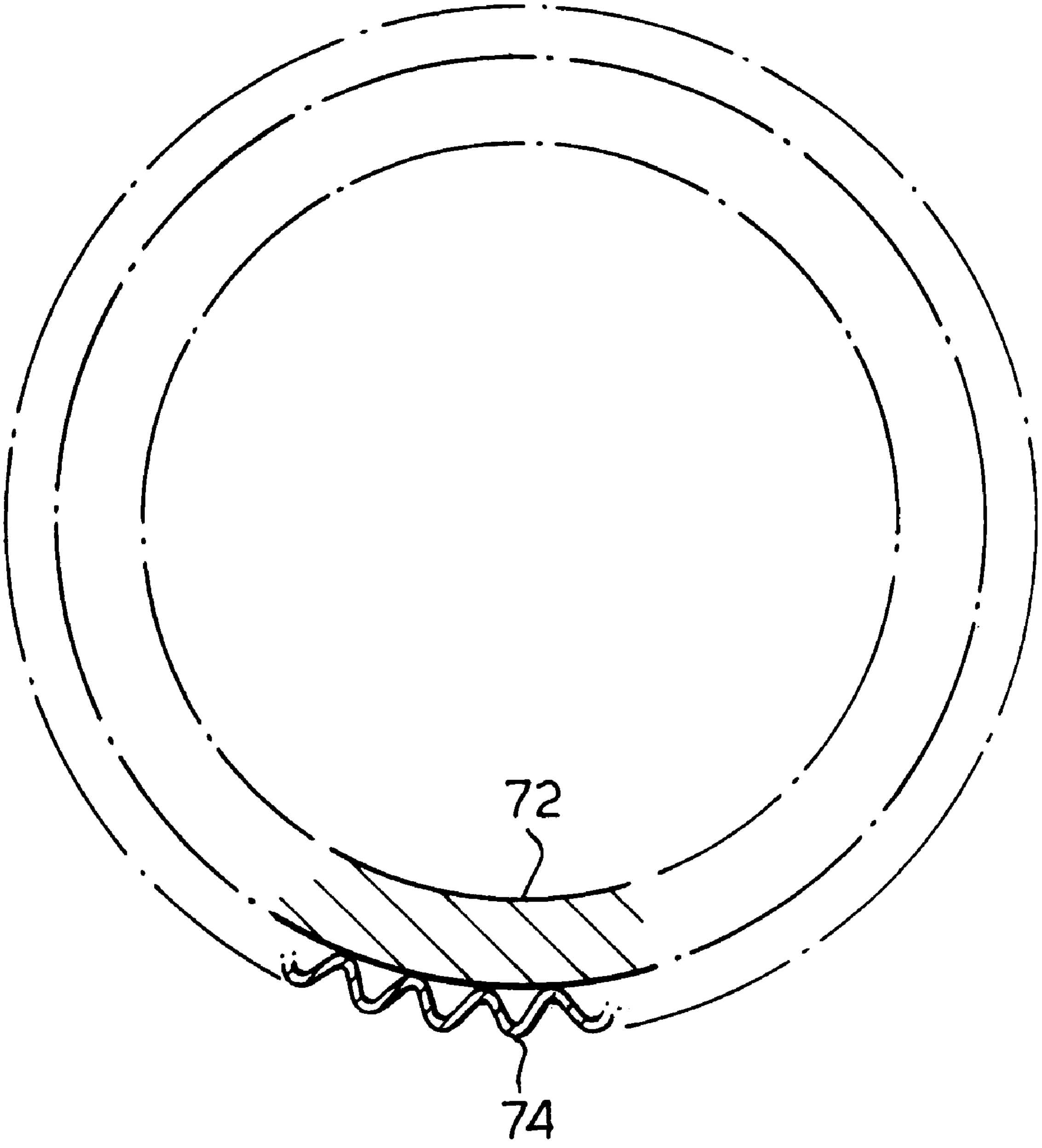
FIG. 3 shows a diagrammatic plan view of the annular sealing ring and its associated 'cockle' spring with only part of the circumference thereof illustrated in detail.

Throughout the following it should be appreciated that upstream and downstream are terms to be related to the left and right ends of the combustion chamber respectively as seen in FIG. 1; air and fuel enter the combustion chamber at its upstream (left) end and the combustion gases produced exit the combustion chamber at its downstream (right) end.

The combustor may be embodied in any conventional turbine layout, e.g. tubular, single can or multi-can, turbo-annular or annular. The combustor has a combustion chamber in which a combustible mixture of air and fuel is burned, the hot 'combustion gases' produced thereby thereafter leaving the combustion chamber to act to drive the turbine. A compressor (not shown) supplies air to the combustion chamber and also for cooling; the compressor is shaft coupled to the turbine to be driven thereby.

The combustor 10 as illustrated in FIG. 1 is of generally cylindrical form and as indicated above may constitute one of a plurality of such combustors arranged in an annular array. The combustor 10 has a main combustion chamber 12. A fuel/air mixer 14 is fixedly positioned at or adjacent the upstream end of the combustion chamber 12, fuel being fed to the mixer 14 via an injector arrangement 60. A combustor outlet or nozzle region 16 at the downstream end of the combustion chamber 12 connects with the turbine 18. The outlet 16 is of reduced diameter relative to the combustion chamber 12, there being a transition zone 18 of reducing diameter in the downstream direction between the main combustion chamber 12 and the outlet 16.

The chamber 12, outlet 16 and zone 18 are defined by generally cylindrical member 20 of unitary construction; the wall 21 of the member 20 has a main portion 22, a reducing diameter portion 24 and a portion 26 which portions respectively define the combustion chamber 12, the transition zone 18 and the combustor outlet region 16. Furthermore, at its upstream end the member 20 has a portion 28 of a reduced diameter relative to the combustion chamber 12, which portion 28 provides for fixing and sealing of the mixer 14 relative to member 20 (see below for further details). Radially outside the member 20 is provided a further generally cylindrical member 30 such that between radially outer surface 21*a* of the wall 21 of member 20 and the radially inner surface 31*b* of the wall 31 of member 30 and running alongside the combustion chamber 20 is provided a passage 40 through which air flows to the mixer 14, the air being supplied by a compressor arrangement as indicated above. The cylindrical member 30 may be of single-piece construction.

As seen, the wall 31 of the member 30 has a main portion 32 which extends axially alongside the portion 22 of member 20, and portions 34 and 36 extending respectively alongside portions 24, 26 of member 20. Further, it will be observed that at least the portion 32 of member 30 diverges away from portion 22 of member 20 in the direction of the mixer i.e. in a direction extending from the downstream end of the combustion chamber to the upstream end of the combustion chamber. This means that the cross-sectional area of the passage 40 increases in that direction.

The air enters the passage 40 through spaced inlet ports 42 defined in the transition portion 34 of the second member 30; indeed such spaced ports may be provided within an area representing substantially the whole axial and circumferential extent of the transition zone 34. Initially this air impinges on the outer surface of the wall of transition portion 24 and the outlet region of member 20 to extract heat from and thus cool the impinged surface of portion 24. As the air, which is still relatively cool, passes along the passage 40 it extracts further heat from the surface 21*a* and because of the increasing cross-sectional area of the passage the air expands (and hence cools) and this further assists in cooling of the combustor. It is to be appreciated that in contradistinction to many prior art arrangements none of the air from the compressor enters the combustion chamber other than at the upstream end thereof. All air flow into the combustion chamber 12 is through the passage 40 and via the mixer 14. Thus all or effectively all the cooling air as supplied by the compressor is also utilized for mixing with fuel in the mixer 14 and this acts to produce a lean combustion mixture. As is well known, such a lean combustion mixture acts to produce relatively low amounts of pollutants, e.g. $NO_x$. Moreover, since all the air is utilized initially for cooling, relatively cool working of the components of the combustor is assured which is an important consideration for component long life. Further, as no cooling air is introduced directly into the combustion chamber there is no quenching effect and lower levels of CO can be readily maintained.

In a preferred arrangement and in order to give maximum cooling, an arrangement which provides turbulence of the air flowing down the passage is provided. In the illustrated embodiment, turbulence inducers in the form of turbulators 48 are provided attached to the outer surface 21*a* of combustion chamber wall portion 22 although it is to be understood that such turbulators may be provided alternatively or additionally on the inner surface 31*b* of wall portion 32 of member 30. Further as shown, the turbulators 48 are positioned towards the larger end of passage 40. Such turbulators 48 comprise generally annular structures extending around the combustor but each with a wave-like configuration. The turbulence thereby induced into the cooling air flowing in the passage improves heat extraction. Air leaving passage 40 enters the mixer 14 and flows radially thereinto as indicated by arrows 50. The mixer 14 is shown as having swirl vanes 52 to ensure thorough mixing of fuel and air but any conventional arrangement is appropriate.

It is to be noted the wall 31 of member 30 has a convoluted or corrugated section 37 adjacent to the downstream end of the passage 40. Such convoluted section 37 comprises a series of inter-connected peaks and troughs provided in the wall 31 each peak/trough extending around the entire circumference of the wall 31. The convoluted section 37 allows for thermal movement of the wall 31 to prevent stress building up therein; thus the section 31 acts effectively as a bellows. Further, however, the convolutions provide a significant cooling effect. As the initially smooth air flow from the right hand end of passage 40 passes over the convolutions it is disturbed by the peaks and troughs and becomes turbulent, thereby achieving greater heat transfer from surface 21*a*.

The inner and outer cylindrical members 20, 30 are attached to the mixer 14 as shown. The fixing of member 30, as shown, utilizes an annular member 38 affixed to member 30 as by bolts 39 and having a radially inwardly extending portion 38*a* affixed to mixer 14 in any conventional manner, e.g. utilizing bolts or screws. The affixing of member 20 to mixer involves a fixing/sealing arrangement 70. More especially there is a fixing/sealing arrangement 70 between the radially outer surface 15*a* of an axially extending cylindrical wall 15 of the mixer 14 and the portion 28 of inner cylindrical member 20. Such arrangement is illustrated in close-up in FIG. 2. The portion 28 is provided as part of the unitary member 20 and wall 15 of mixer 14 extends therethrough. The portion 28 comprises an axially extending portion 28*a* integral with a radially inwardly converging portion 29, and further comprises radially extending portions 28*b*, 28*d* conjoined by an axially extending portion 28*c*. The portions 28*b*, 28*c*, 28*d* define an annular recess 28*e*. A sealing means taking the form of an annular piston ring 72 is received in annular recess 28*e* with a respective clearance at each side to allow of a degree of axial sliding movement of the piston ring 72 in the recess 28*e*. Further, the piston ring 72 is flexible, being capable of a degree of flexible movement in circumferential directions. Resilient element 74 acts on the piston ring 72 to push it generally radially into sealing engagement with the outer cylindrical wall 15*a* of the mixer body 14. Such resilient element may be in the form of a wavy spring 74, a so-called 'cockle' spring. In contradistinction to the prior art where this sealing arrangement is provided towards the downstream end of the combustion chamber it will be observed that this sealing arrangement is at the upstream end. This means that the diameter of the piston ring and its associated spring is reduced in comparison with prior art arrangements. This reduces the cost. Also because temperatures in this position are generally lower than towards the downstream end of the combustion chamber, which lends to deterioration in the spring's performance, the spring will tend to maintain its springiness for longer. Also there tends to be a certain amount of air leak through the gaps between the waves of the spring and this is reduced by utilizing a reduced diameter spring.

The mixer 14 and its associated injector arrangement 60 may be affixed in position by means of a fixing arrangement 54 which is accessible externally e.g. a plurality of bolts. By means of such an arrangement dismantling of the combustor is relatively easy; the bolts are removed and the mixer/injector can be removed axially simply by sliding out.

What is claimed is:

1. A combustor for a gas turbine engine in which a compressor supplies air to the combustor for cooling thereof and combustion therein, the combustor comprising:

a) a radially inner member being of generally cylindrical formation and defining a combustion chamber, b) a radially outer member, c) a fuel/air mixer provided at an upstream end of the combustor as referred to a direction of flow of combustion products therethrough, d) said radially inner and outer members defining therebetween a cooling passage extending generally axially alongside the combustion chamber over at least part of a length thereof, the cooling passage having air inlet means comprising a plurality of inlets adjacent to a downstream end of the combustor for entry of air into the cooling passage from the compressor, the air flowing towards the mixer to cool the combustor and then entering the mixer to mix with fuel to provide a combustible mixture, the cross-sectional area of the cooling passage increasing over at least part of a length of the cooling passage in a direction from the downstream end to the upstream end of the combustion chamber, e) the formation of the radially inner member having a portion of reduced diameter at the upstream end affixed to the mixer, the reduced diameter portion being shaped to provide an annular chamber, and f) a sealing means in the annular chamber for sealing engagement with the mixer.

2. A-combustor as claimed in claim 1 wherein resilient means are provided to bias the said sealing means generally radially inwardly into engagement with the mixer.

3. A combustor as claimed in claim 1 wherein said sealing means comprises an annular piston ring arranged so as to be capable of axial sliding movement.

4. A combustor for a gas turbine engine in which a compressor supplies air to the combustor for cooling thereof and combustion therein, the combustor comprising:

a) a radially inner member defining a combustion chamber, b) a radially outer member having a flexible portion, and c) a fuel/air mixer provided at an upstream end of the combustor as referred to a direction of flow of combustion products therethrough, d) said radially inner and outer members defining therebetween a cooling passage extending generally axially alongside the combustion chamber over at least part of a length thereof, the cooling passage having air inlet means comprising a plurality of inlets adjacent to a downstream end of the combustor for entry of air into the cooling passage from the compressor, the air flowing towards the mixer to cool the combustor and then entering the mixer to mix with fuel to provide a combustible mixture, the cross-sectional area of the cooling passage increasing over at least part of a length of the cooling passage in a direction from the downstream end to the upstream end of the combustion chamber.

5. A combustor as claimed in claim 4 wherein the flexible portion is corrugated to allow for thermal movement of the wall without stress.

6. A combustor as claimed in claim 5 wherein the corrugated portion causes turbulence in the airflow through said passage.

7. A combustor for a gas turbine engine in which a compressor supplies air to the combustor for cooling thereof and combustion therein, the combustor comprising:

a) a member defining a combustion chamber, b) a fuel/air mixer provided at an upstream end of the combustor as referred to a direction of flow of combustion products therethrough, and c) a sealing arrangement provided between the member and the mixer, the arrangement including a substantially annular sealing means received in a recess formed in one of the member and the mixer, and a resilient means acting on and moving the sealing means generally radially relative to the member, the resilient means constituting at least one annular spring having a wave-like configuration.

8. A combustor for a gas turbine engine in which a compressor supplies air to the combustor for cooling thereof and combustion therein, the combustor comprising:

a) a member defining a combustion chamber, b) a fuel/air mixer provided at an upstream end of the combustor as referred to a direction of flow of combustion products therethrough, and c) a sealing arrangement provided between the member and the mixer, the arrangement including a substantially annular sealing means received in a recess formed in one of the member and the mixer, and a resilient means acting on and moving the sealing means generally radially relative to the member, the sealing means constituting a flexible piston ring arranged for axial sliding movement.

9. A lean-burn, low emissions combustor for a gas turbine engine in which a compressor supplies air to the combustor for cooling thereof and combustion therein, the combustor comprising:

a) a radially inner member defining a combustion chamber, b) a radially outer member, and c) a fuel/air mixer provided at an upstream end of the combustor as referred to a direction of flow of combustion products therethrough, d) said radially inner and outer members defining therebetween a cooling passage extending alongside the combustion chamber, the cooling passage having air inlet means and air outlet means, the air inlet means comprising a plurality of inlets provided in the radially outer member adjacent to a downstream end of the combustor for entry of air into the cooling passage from the compressor, the air outlet means comprising inlet passage means of the fuel/air mixer, the cross-sectional area of the cooling passage increasing from the air inlet means to the air outlet means to provide a cooling effect by expansion of air in the passage as the air flows from the air inlet means to the air outlet means, wherein air for combustion enters the combustion chamber solely through the fuel/air mixer after flowing through the cooling passage, the fuel/air mixer being adapted to mix the air with fuel to produce a fuel-lean fuel/air mixture before entry of the mixture to the combustion chamber.

10. A combustor as claimed in claim 9 wherein the inlets are provided in a transition portion of the outer member and, in use, the air passing through the inlets impinges on a transition portion of the inner member to give impingement cooling.

11. A combustor as claimed in claim 9 wherein the radially inner member is of generally cylindrical formation with a portion of reduced diameter at its upstream end which is affixed to the mixer.

12. A combustor as claimed in claim 9 wherein turbulence inducing means are provided in the cooling passage to produce turbulence in the flow of cooling air therethrough.

13. A combustor as claimed in claim 12 wherein said turbulence inducing means comprises at least one turbulator affixed to a said member to extend into said cooling passage.

14. A combustor as claimed in claim 9 wherein the mixer is affixed in position by fixing means which are removable to allow axial movement of the mixer in a direction away from the combustion chamber.

15. A combustor for a gas turbine engine in which a compressor supplies air to the combustor for cooling thereof and combustion therein, the combustor comprising:

a) a member defining a combustion chamber, b) a fuel/air mixer provided at an upstream end of the combustor as referred to a direction of flow of combustion products therethrough, and c) a sealing arrangement provided between the member and the mixer, the arrangement including a substantially annular sealing means received in a recess formed in one of the member and the mixer, and a resilient means acting on and moving the sealing means generally radially relative to the member.

16. A combustor as claimed in claim 15 wherein the recess is defined by a pair of spaced generally radially extending wall portions of the member and a generally axially extending portion of the member extending between said radially extending portions.

17. A combustor as claimed in claim 15 wherein the resilient means is in the form of at least one spring.

* * * * *